United States Patent
Hamiel et al.

(10) Patent No.: US 6,966,252 B2
(45) Date of Patent: Nov. 22, 2005

(54) HYDROPHILIC SUBSTANCE DISPENSING DEVICE

(75) Inventors: Lee J. Hamiel, Queensbury, NY (US); Shyhyuan Liao, West Windsor, NJ (US); Thomas E. Sox, Ambler, PA (US)

(73) Assignee: McNeil-PPC, Inc., Skillman, NJ (US)

( * ) Notice: Subject to any disclaimer, the term of this patent is extended or adjusted under 35 U.S.C. 154(b) by 51 days.

(21) Appl. No.: 10/403,569

(22) Filed: Mar. 31, 2003

(65) Prior Publication Data

US 2004/0187692 A1 Sep. 30, 2004

(51) Int. Cl.$^7$ ............... A47J 31/00; A23L 2/00
(52) U.S. Cl. ............... 99/323; 99/295; 426/85; 426/112
(58) Field of Search ............... 99/323, 229, 295; 426/112, 115, 85, 87, 89; 222/189, 54, 129, 129.3; 239/33

(56) References Cited

U.S. PATENT DOCUMENTS

| | | | |
|---|---|---|---|
| 3,154,418 A | | 12/1964 | Loveli et al. |
| 3,264,115 A | | 8/1966 | Davis |
| 3,312,555 A | | 4/1967 | Rossi et al. |
| 3,615,595 A | * | 10/1971 | Guttag ............... 426/85 |
| 3,824,322 A | | 7/1974 | Fiorella |
| 3,869,555 A | | 3/1975 | Heonis |
| 4,849,231 A | | 7/1989 | Spee |
| 4,860,929 A | * | 8/1989 | Lowe et al. ............... 99/323 |
| 4,891,232 A | * | 1/1990 | Dahl ............... 426/78 |
| 4,921,713 A | * | 5/1990 | Fowler ............... 426/85 |
| 4,981,468 A | | 1/1991 | Benfiel et al. |
| 4,986,451 A | | 1/1991 | Lowe et al. |
| 5,094,861 A | * | 3/1992 | D'Auguste et al. ............... 426/85 |
| 5,125,534 A | * | 6/1992 | Rose et al. ............... 222/54 |
| 5,440,976 A | | 8/1995 | Giuliano et al. |
| 5,866,185 A | | 2/1999 | Burkett |
| 6,399,126 B1 | | 6/2002 | Weldon, Jr. |
| 2001/0038871 A1 | | 11/2001 | Nardi |

FOREIGN PATENT DOCUMENTS

| | | |
|---|---|---|
| EP | 0 476 932 A1 | 3/1992 |
| EP | 0 630 647 A1 | 12/1994 |
| EP | 1 238 608 A1 | 9/2002 |
| FR | 2 688 396 A1 | 9/1993 |
| WO | WO 99/09871 A1 | 3/1999 |

* cited by examiner

Primary Examiner—Reginald L. Alexander
(74) Attorney, Agent, or Firm—Timothy E. Tracy

(57) ABSTRACT

A device for dispensing into a liquid at least one hydrophilic substance deposited thereon including a body having at least one surface area enhancer and at least one hydrophilic substance deposited on the at least one surface area enhancer, to form a coated surface enhancer, and the body. The hydrophilic substance deposited includes a high intensity sweetener, a nutritive sweetener, a flavoring agent, a drug substance, a vitamin, a mineral, and mixtures thereof.

1 Claim, 10 Drawing Sheets

HYDROPHILIC SUBSTANCE DISPENSING DEVICE

FIELD OF THE INVENTION

The present invention relates to devices for dispensing a hydrophilic substance to a liquid.

BACKGROUND OF THE INVENTION

Consumers differ considerably in the amount of sweetness that they prefer in foods and beverages. The amount of sweetness incorporated into a liquid during commercial production may not be adequate to satisfy some consumers while other consumers may find that the same amount of sweetness to be excessive. Therefore, there exists a long-felt need for mechanisms that consumers can use to increase the sweetness of a product at the time of consumption that is consistent with their personal preference, without introducing an additional caloric burden.

Methods for dispensing hydrophilic substances into a liquid are known. For example, adding sweetener to an unsweetened iced tea beverage will typically involve several steps—adding the sweetener to the unsweetened iced tea beverage followed by stirring to incorporate the sweetener to create a sweetened iced tea beverage. Such sweetener is typically in a powdered, liquid, or tablet form. Similar effort is undertaken when adding powdered or liquid beverage mix to a liquid, e.g., water, milk, alcohol, and the like.

The availability of high intensity sweeteners (HIS) provides novel technical routes to the delivery of sweeteners to individual servings of beverages. These new technical approaches are made possible by the minute quantities of these sweeteners needed to achieve adequate sweetening of individual servings. For example, sucralose is about 600 times as sweet as sucrose (table sugar or cane sugar). Therefore, one teaspoon of sugar (about 4 g) can be replaced by only about 6.7 mg of sucralose.

Although the very small quantities of high intensity sweeteners needed to sweeten individual servings of beverages offer new technical approaches, delivering this small amount of a sweetener to a disposable serving device also presents challenges. One common approach is the blending of the high intensity sweetener with non-sweet, bland materials, and then adhering these materials to a serving device. This introduces complexity in manufacture, and also introduces possibly unwanted caloric intake to the user's diet.

Sweetening individual servings of a beverage presents a challenge in many food service situations. Frequently, an individual packet of a sweetener is provided along with a serving of a beverage. The packet may contain sucrose, or alternatively may contain high intensity sweeteners such as sucralose, aspartame, or saccharin. The user must open the packet and empty the contents into the beverage, and then stir the beverage to obtain dissolution of the sweetener and its complete dispersion in the liquid mass. The residual packaging of the packet creates waste that may present disposal problems under many situations. Also, a device is needed to stir the liquid to which the sweetener has been added. This stirring device may be a reusable or disposable spoon. More frequently, especially in casual dining, convenience stores, or fast food situations a simpler stir stick is provided. This stick may be wooden, but more generally it is an extruded plastic object.

The multi-step process involved in satisfactorily adding a hydrophilic substance to a liquid has been addressed by many methods. Most of these methods combine a stirring device with the hydrophilic substance, e.g., sweetener, flavoring agent, coffee, cocoa, tea, and the like.

One such approach is directed to placing a free flowing hydrophilic substance inside a container having a receptacle for holding the substance. This approach is described in U.S. Pat. Nos. 3,154,418; 4,860,929; 4,986,451; 5,125,534; 5,440,976; and 5,866,185.

U.S. Pat. No. 3,154,418, which is expressly incorporated herein by reference, discloses, among other things, a spoon having two cavities. One cavity is covered by a mesh and is used to contain a material, such as, tea, coffee, or cocoa for making a beverage. A second cavity was purported to be in a handle of the spoon. This second cavity is used to deliver beverage components, such as, sweetener. Delivery of material from the second chamber is achieved by squeezing the spoon handle or shaft of the stir stick, thereby breaking a seal and permitting the contents to flow into the beverage by gravity.

U.S. Pat. No. 3,824,322, which is expressly incorporated herein by reference, discloses a flavored tubular stirrer for alcoholic beverages. The disclosed stirrer was described as having stirring and handle portions, and flavoring means for aqueous alcoholic beverages that is held to a stirring portion of the stirrer with at least part of the flavoring communicable with an alcoholic beverage in which it is placed through or at an exterior surface of the stirring portion. The flavoring means were described as being a natural extract, a solid, or be capable of being converted to solid form by being deposited on or sorbed by a carrier. The carrier was described as being a sugar, sorbitol, manitol, corn syrup solids, milk solids, monoglycerides or diglycerides, and the like. In addition, the perforations were disclosed as being pushed inwardly so as to provide projections to assist in holding the flavoring means in place therein.

U.S. Pat. Nos. 4,860,929 and 4,986,451, which are expressly incorporated herein by reference, allegedly disclose a dispensing device for soluble granular material. The device includes a tube containing a solid granular material. The tube being closed at both ends and having perforations along a portion of its length and having a paddle formed at one end. In this design and in the dry state, the granular material must be sized so as not to escape through the perforations while the granular material is in a dry state.

U.S. Pat. No. 5,125,534, which is incorporated herein by reference, discloses a multiple compartment dispenser that is capable of simultaneously dispensing multiple dry flavoring ingredients into a fluid. The dispenser described contains a chamber having a spine with a plurality of vanes or blades projecting therefrom that extend into a lower housing to form multiple compartments. The lower housing was described as being a dissolvable film, such as, gelatin or methylcellulose, that is formed to fit over the bottom portion of the spine and the associated horizontally projecting vanes. Each of the multiple compartments was described as being individually filled with a flavoring ingredient prior to dispensing. Flavoring ingredients included sugar, coffee, hot chocolate, and bouillon.

U.S. Pat. No. 5,440,976, which is incorporated herein by reference, allegedly discloses a device for dispensing natural and artificial sweeteners into a beverage. The device includes a tube having perforations and at least one separator disk positioned therein, and a solid sleeve formed to receive the tube. The tube is in the sleeve such that the tube may be urged forward dispensing a measured amount of sweetener into the beverage. Control of sweetness intensity was allegedly described as being further enhanced by providing calibration markers on the surface of the tube.

U.S. Pat. No. 5,866,185, which is expressly incorporated herein by reference, discloses a device including a tube including a soluble or dispersible material and a soluble coating formed on the outer surface of the tubular portion. The soluble coating can be sugar or an artificial sweetener and is dissolved when the coating comes into contact with liquid. The tube is also disclosed as having perforations to control the rate that the soluble material is dispersed in the liquid. The soluble material was described as being a variety of substances that are soluble in liquid, including flavors, such as, cherry, orange, grape, and fruit punch.

Another approach is directed to attaching a solid mass to a handle and dissolving the solid mass in a liquid. This approach is described in U.S. Pat. Nos. 3,869,555; 4,849,231; 6,399,126, and U.S. Pat. App. Pub. No. 20010038871.

U.S. Pat. No. 3,869, 555, which is incorporated herein by reference, discloses a soluble solid mass secured to a wooden stick. The solid mass was discloses as having a base mass and an optional flavoring mass. The base mass was described as being instant coffee crystals or particles, tea, cocoa, eggnog, and chocolate with binder material. The flavoring mass was described as being powdered milk and/or sugar that is held together by a binder material, which could be sugar or may be taste-free.

U.S. Pat. No. 4,849,231, which is expressly incorporated herein by reference, discloses a stirring rod having a stirring body that has a holder for holding a solid mass, e.g., sugar lump. More than one holder can be included in the body of the stirring rod. In addition to sugar lumps, sweetener tablets containing high intensity sweeteners, such as, aspartame or saccharin, powdered milk, coloring, and flavoring are disclosed. In another embodiment, there is disclosed a wooden stirring body that was immersed in a warm, liquid sugar or other substance, where a quantity of substance has remained adhered thereto, the quantity corresponding to a quantity of substance, for example sugar or sweetener, e.g,, aspartame, geared to an amount of beverage. After cooling, the solid piece of the substance is held by a holder. The quantity of substance to be added to the beverage was disclosed as being regulated by inserting the stirring rod more or less deeply into the beverage that is to be stirred.

U.S. Pat. No. 6,399,126, which is incorporated herein by reference, discloses a flavored beverage stirrer that includes a carrier and a cartridge. The cartridge was disclosed as being formed from a flavored material, which dissolves and adds flavor to a beverage.

U.S. Pat. App. Pub. No. 20010038871, which is incorporated herein by reference, discloses an embodiment wherein a predetermined quantity of a water soluble extract is sprayed onto the inner surface of a straw. The coated-interior of the straw will provide an agent of choice to be incorporated into a liquid.

The above approaches suffer from a number of drawbacks. In particular, due to the complexity of most of the above solutions, manufacturing costs and difficulties present obstacles to adoption. In addition, none of the solutions address the problem of increasing the dissolution rate of a hydrophilic substance while maintaining the same compact size of the device.

SUMMARY OF THE INVENTION

The present invention is directed to a device that satisfies these needs. The device of the present invention is easy to manufacture, convenient, and provides increased surface area for loading of the hydrophilic substance. This disclosure provides new individual serving sweetening compositions that can avoid the incorporation of substantial amounts of carrier materials. In one embodiment, the present invention includes a device for dispensing into a liquid at least one hydrophilic substance deposited thereon comprising, consisting essentially of, and consisting of a body having at least one surface area enhancer and at least one hydrophilic substance deposited on the at least one surface area enhancer, to form a coated surface enhancer, and the body.

In another embodiment, the present invention includes a device for dispensing into a liquid at least one hydrophilic substance deposited thereon comprising, consisting essentially of, and consisting of an elongated body having at least one surface area enhancer and sucralose deposited on the at least one surface area enhancer and the body.

DETAILED DESCRIPTION OF THE INVENTION

Figure 1:
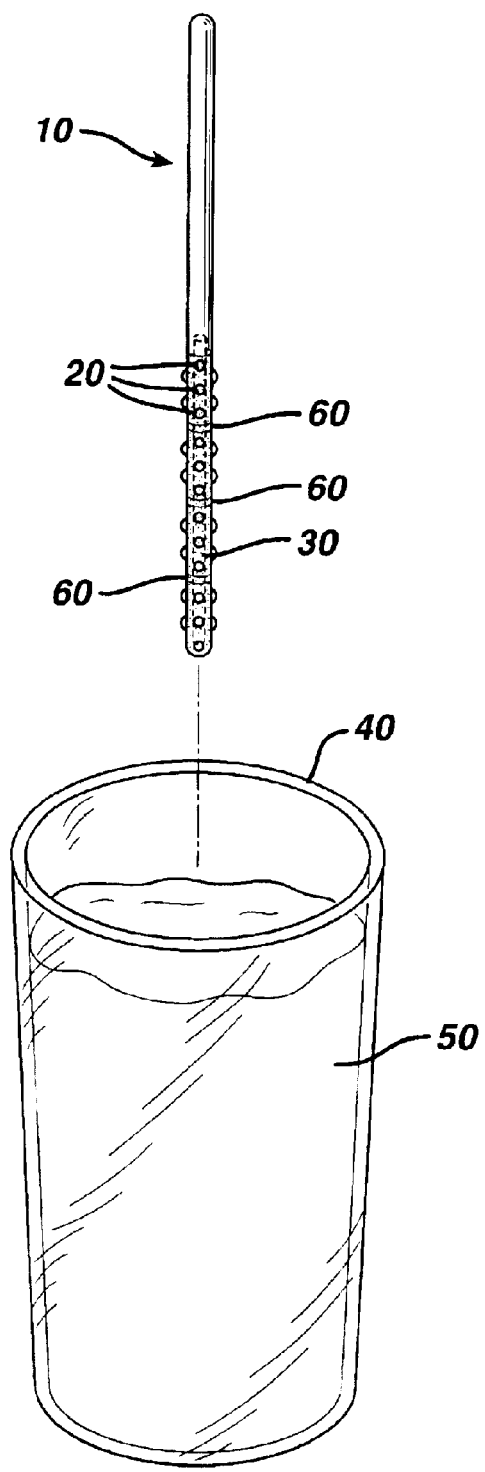
FIG. 1 is a perspective view of device representing one embodiment of the present invention and a vessel containing a liquid.

As used herein, the term "drug substance" denotes materials with pharmacological or nutritional benefits. Such drug substances include, but are not limited to, acetaminophen, famotidine, chlorpheniramine, pseudoephedrine, dextromethorphan, diphenhydramine, brompheniramine, clemastine, phenylpropanolamine, terfenadine, astemizole, loratadine, loperamide, loperamide-N-oxide, ranitidine, cimetidine, tramadol, cisapride, acetylsalicylic acid, doxylamine succinate, pharmaceutically acceptable salts thereof and mixtures thereof.

As used herein, the term "hydrophilic substance" denotes any substance that dissolves or can be suspended in a liquid. A non-limiting list of hydrophilic substances includes HIS, nutritive sweetener, sugar alcohol, a flavoring agent, a drug substance, a vitamin, a mineral, and mixtures thereof.

As used herein, the term "high intensity sweetener(s)" or "HIS", denotes substances, such as, aspartame, salts of acesulfame, alitame, brazzein, cyclamic acid and its salts, dihydrochalcones, extract of *Dioscorophyllum cumminsii*, and extract of the fruit of *Pentadiplandra brazzeana*, glycyrrhizin, hernandulcin, monellin, mogroside, neotame, neohesperidin, saccharin and its salts, sucralose, stevia, thaumatin, and the like, alone or in combination.

As used herein, the term "nutritive sweetener denotes" corn syrup, glucose, fructose, high fructose corn syrup, lactose, sucrose, trehalose, lactose, arabinose, trehalose, maltodextrin, soluble starch, inulin, and the like, alone or in combination.

As used herein, the term "sugar alcohol" denotes erythritol, hydrogenated isomaltulose, hydrogenated starch hydrolyzates, lactitol, maltitol, mannitol, sorbitol, xylitol, and the like, alone or in combination.

As used herein, the term "surface area enhancer" denotes any contrivance in or on the device that is used to increase the surface area of the device. Such contrivances include, but are not limited to, a surface crack, a fissure, a crevice, a protrusion, a capillary, an internal crack, a bore, a fenestra, a slit, and combinations thereof. Where a smooth bore or capillary is imbedded in the interior of the device, such capillary or bore does not extend fully through the length of the device.

The present invention is directed to a device for stirring a liquid while additionally dispensing a hydrophilic substance, e.g., HIS, nutritive sweetener, sugar alcohol, flavoring agent, coloring agent, coffee, tea, cocoa, drug substance, and the like, alone or in combination, into the liquid. The device of the present invention contains at least one surface area enhancer and the device can be loaded with a coating that is a solution containing a hydrophilic substance and allowing the coating to dry by any known method, e.g., heat to expedite drying.

Capillary or adhesive forces may be used to control the amount of coating deposited on the device.

While the present invention is not dependent upon, bound to, or limited by, any particular theory, surface tension is a property of liquids, and the surface tension of a liquid or solution is dependent on a number of factors, including temperature and solute content. When a narrow diameter foramen, fenestra, or slit is contacted to the surface of a liquid, the surface tension of the liquid will frequently cause a small portion of the liquid to be drawn up into the foramen or slit. This phenomenon has been described as capillary force or capillary attraction, though it is a derivative effect of surface tension. The volume of liquid bound to the solid surface will depend on the surface tension of the liquid, as well as the type of material or materials constituting the surface, and the texture of the surface. However, as long as all conditions remain constant, the amount of fluid so entrained will be relatively constant; e.g., if a number of capillary tubes are immersed to the same depth in a liquid, approximately the same amount of liquid will be drawn up into each of these tubes. After the foramen, capillary, or slit is withdrawn from the surface of the liquid, a volume of liquid remains adherent.

When liquid contains a solute, such as, a HIS, the HIS remains adhered to the surface. The liquid can then be removed by common processes such as evaporation, thereby leaving a residue or a coating of the HIS on the surface of the device. The coated HIS can therefore be retained in stable form until the coated surface of the device is again exposed to a liquid in which the solute is soluble. In this case, a volume of the new liquid penetrates into the foramen, capillary, or slit. The liquid serves to dissolve the high intensity sweetener. Diffusion occurring within the liquid results in the dispersion of the HIS into the bulk of the liquid. Stirring the liquid with the device r will aid in the dissolution and dispersion of the HIS into the liquid.

Any amount of hydrophilic substance can be coated onto the device of the present invention. Typically, if one were loading an HIS or a nutritive sweetener one would wish to coat the device such that one, two, or three teaspoons equivalents of sucrose are on the device. The concentration of the hydrophilic substance in the liquid will impact the volume of solution loaded on the device. Loading of the solution onto the device can be achieved by any means known to those in the art. These include dipping the device into the solution, spraying the device with solution, and brushing the solution onto the device. The greater the surface area of the device the more of the solution that can be loaded onto the device.

In one specific embodiment of this invention, a rod or shaft is fabricated that has a plurality of narrow diameter capillaries in one or both of the ends of the rod or shaft. The capillaries may be straight channels that are oriented parallel to the axis of the rod or shaft. Alternatively, the capillaries may be curved regularly or irregularly, or they may have a serpentine shape. The capillaries may be circular in a cross section perpendicular to the axis of the rod or shaft, or they may be oval or highly irregular. For a given concentration of solution, the amount of solution that will be loaded on the device is dependent on the shape and depth of the capillaries.

Embodiments of this invention include devices in which only a single foramen, capillary, or slit is present, as well as embodiments in which a plurality of such cavities are present.

Furthermore, the embodiments of this invention include devices in which the cavities are present in one end of the shaft or rod, as well as embodiments in which the cavities are incorporated in both ends. Incorporating the cavities into both ends of the device offer a number of advantages.

The same amount of hydrophilic substance can be coated into both ends of the devices, allowing the user to dispense the amount of hydrophilic substance in one end or both ends of the device into single serving of beverage, depending on the user's preferences.

Alternatively, the user could add the hydrophilic substance to one serving of beverage using one end of the device, and then use the other end to add the same or different hydrophilic substance to a second serving of a beverage. Alternatively, different amounts of hydrophilic substance could be incorporated into each end of the device. If a sweetener is the hydrophilic substance, such a device could be labeled or marked to indicate the less sweet end and most sweet end. The user could select which end to use, depending on the sweetness preferences.

Another approach would entail loading different types of hydrophilic substance into each end of the device. For example, one end could be loaded with sucralose, whereas the other end could be loaded with another sweetener, such as, saccharin, aspartame, or neotame. Some consumers differ in their preferred sweetener, and a sweetening device configured with different sweeteners at each end would permit the user a choice of sweeteners.

The stirring devices of this disclosure are generally rod-shaped, with rod shaped being broadly defined to include elongated shapes that are generally circular or oval in cross section. However, objects that are square in cross section or more generally polygons with sides of generally equal length are also functionally equivalent for stirring and are included within the scope of being rod shaped. Specifically excluded from the intended scope of rod shape are generally planar devices, i.e., in which the length of two sides of the cross-sectional shape exceed the length of the other sides by a factor of five times or greater. Generally rod shaped devices as defined herein have a functional advantage over planar devices in that the ability to adequately stir a fluid comestible is independent of how the axial dimension of the device is oriented with respect to the fluid. In contrast, in order for adequate stirring to be obtained with a planar device, the device must be oriented to that the broadest cross-sectional surface is generally perpendicular to the direction of stirring.

Capillaries penetrating into the body of the rod or stir device are contemplated, as are generally smooth exterior surfaces. Also contemplated are surface cracks, fissures, or crevices that are incorporated into the ends of the device, or into the sides of the device. Such cracks or crevices also present solid surfaces in close juxtaposition, and surface tension of some liquids will cause a portion of these liquids to become adherent to the surface cracks, fissure, or crevices. Devices containing such cracks, fissures, or crevices may similarly be loaded with a sweetener solution by immersing the appropriate surface into the sweetener solution. The use of relatively shallow surface cracks, fissures or crevices may diminish the drying time needed to remove solvent adhering to the surfaces, and this will also decrease the amount of time needed to obtain dissolution of the sweetener.

The hydrophilic substance coating of this disclosure will generally have a bulk density of greater than about 0.5 g per cubic centimeter, in contrast to porous crystalline lattice materials with bulk densities of about 0.2 g/cc or less.

The embodiments contemplated by this disclosure are by no means limited to HIS. For example, a flavor agent may be incorporated into the sweetener solution that is used for coating the device. When the device is suitably dried and later immersed into an appropriate liquid, the sweetener and the flavor agent are released into the liquid.

HIS are generally non-volatile and no loss of sweetener should occur during the drying of the contemplated devices. However, some flavor components are quite volatile, and the incorporation of some flavor components will necessitate careful control of the drying conditions so that the aesthetic impact of the flavor material is not compromised. The flavor material used can be selected based on the type of beverage that will be sweetened with the device. For example, flavors that may be consumed with coffee include cream, vanilla, chocolate, cinnamon, almond, pecan, or anise. In contrast, flavors that may be used when the device is used to sweeten tea include lemon, lime, raspberry, peach, or mango. Blends of flavors are also suitable for these applications. Flavors contemplated as being useful include the above flavors and the following non-exhaustive list vanillin, butter, butterscotch, tea, orange, lemon, lime, tangerine, almond, walnut, pecan, caramel, chocolate, licorice, strawberry, banana, peach, grape, plum, cherry, blueberry, pineapple, elderberry, currant, cranberry, lingonberry, watermelon, bubblegum, cantaloupe, mango, guava, kiwi, papaya, coconut, mint, spearmint, anise, caraway, cardoman, cinnamon, ginger, cream, and mixtures thereof.

In addition to flavors, other materials may also be loaded into the device of the present invention. Contemplated materials include pharmaceutical agents, vitamins, or antioxidants; the principal technical challenges involved in inclusion of these other materials include the amount of material that must be ingested to obtain a therapeutic or physiologic benefit, and the stability of the additional material in the loading solution, stability in the dry state, and stability in the solution in which the device is finally used.

A further contemplated embodiment of this invention is the provision of graduations or markings that allow the user to control the amount of sweetness dispensed. For example, the devices may be marked by a series of axially oriented lines, dots, letters, numbers, or other means. The user can use these markings to control the depth of insertion of the device into the ingestible beverage or fluid. This controls the amount of sweetener delivered, and hence the user is provided with a mechanism for controlling sweetness. This provides a benefit in comparison to packets of high intensity sweeteners, since it is difficult to use only a portion of such a packet in a controlled manner.

The sweetening devices of this invention may be packaged in a number of ways. For example, the devices in quantity may be placed into boxes, envelopes or pouches or other suitable packages. A small number of sweetening devices, for example, about 2 to about 50, may be placed in a suitable package for the convenience of a single user. The incorporation of these into a pouch or an envelope may be particularly convenient for the user. A larger number of sweetening devices, for example from about 50 to about 5000, may be packaged into a single container. This approach may be especially suitable for food service applications.

The sweetening devices may also be individually packaged into a suitable protective container. This container may be a sealed pouch or sleeve made from plastic film or paper. The container may also be a tube formed of plastic or cardboard. The container may also be formed from a metal foil, or a combination of the materials disclosed above. Individually packaged containers may be especially useful in situations where hygiene may be compromised, such as camping trips, outdoor activities, or crowded conditions.

A further contemplated embodiment is the incorporation of these sweetening devices in a dispenser that simplifies their use. In particular, the dispenser facilitates the release of a single device. One example is a device containing a sliding or hinged opening. The diameter of the opening permits only one sweetening device to be released at a time. A further embodiment is a device with a depressible or sliding button or tab. Each actuation of the sliding button or tab results in the ejection of a single sweetening device. These dispensing devices have a benefit of requiring only one hand for their use; this permits the user to simultaneously hold a container of beverage in the other hand.

A process for making a device for delivering a high intensity sweetener composition to an ingestible liquid, the process comprising: providing a generally rod shaped device, providing a solution of a high intensity sweetener contained in one or more solvents, immersing at least a portion of the rod shaped device into the high intensity sweetener solution so that a portion of the high intensity sweetener solution is adherent to the rod shaped device, and removing the one or more solvents such that high intensity sweetener in solid form remains on the surface of the device.

Figure 2:
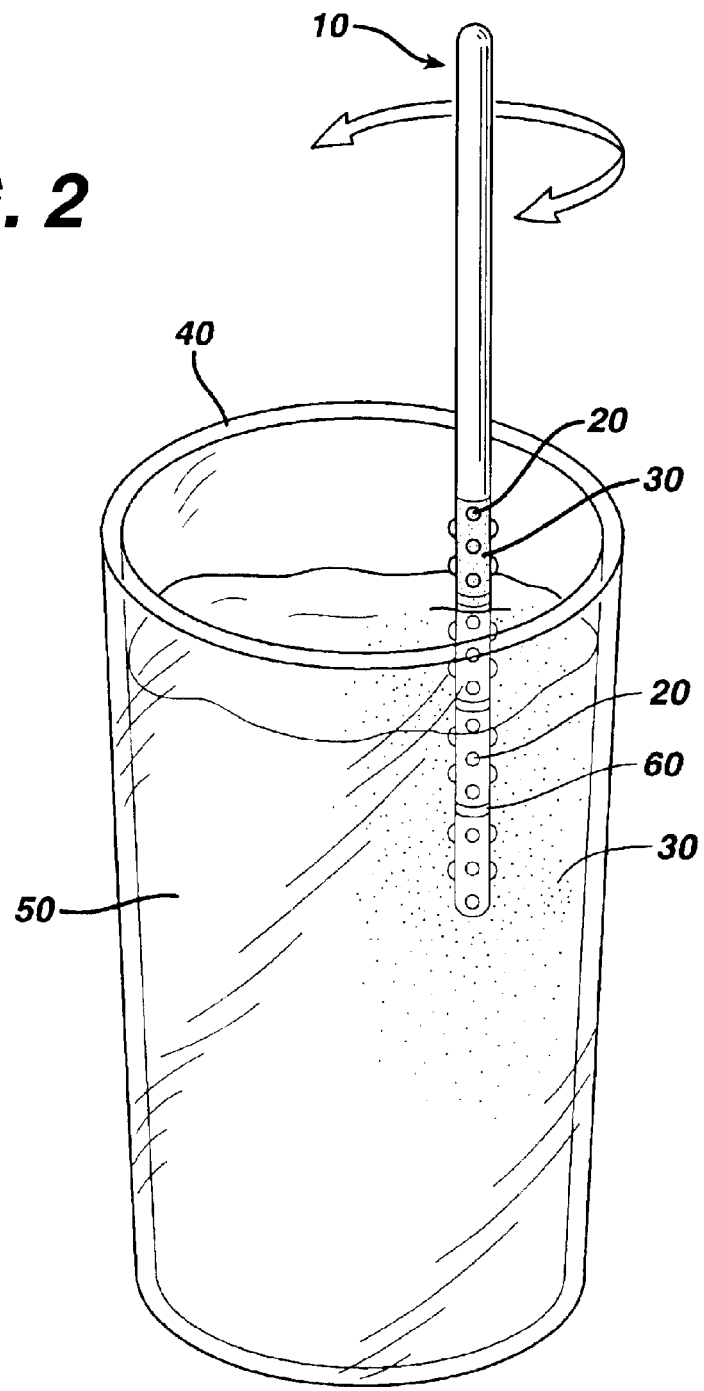
FIG. 2 is a perspective view of device representing one embodiment of the present invention placed in a vessel containing a liquid.
Figure 3:
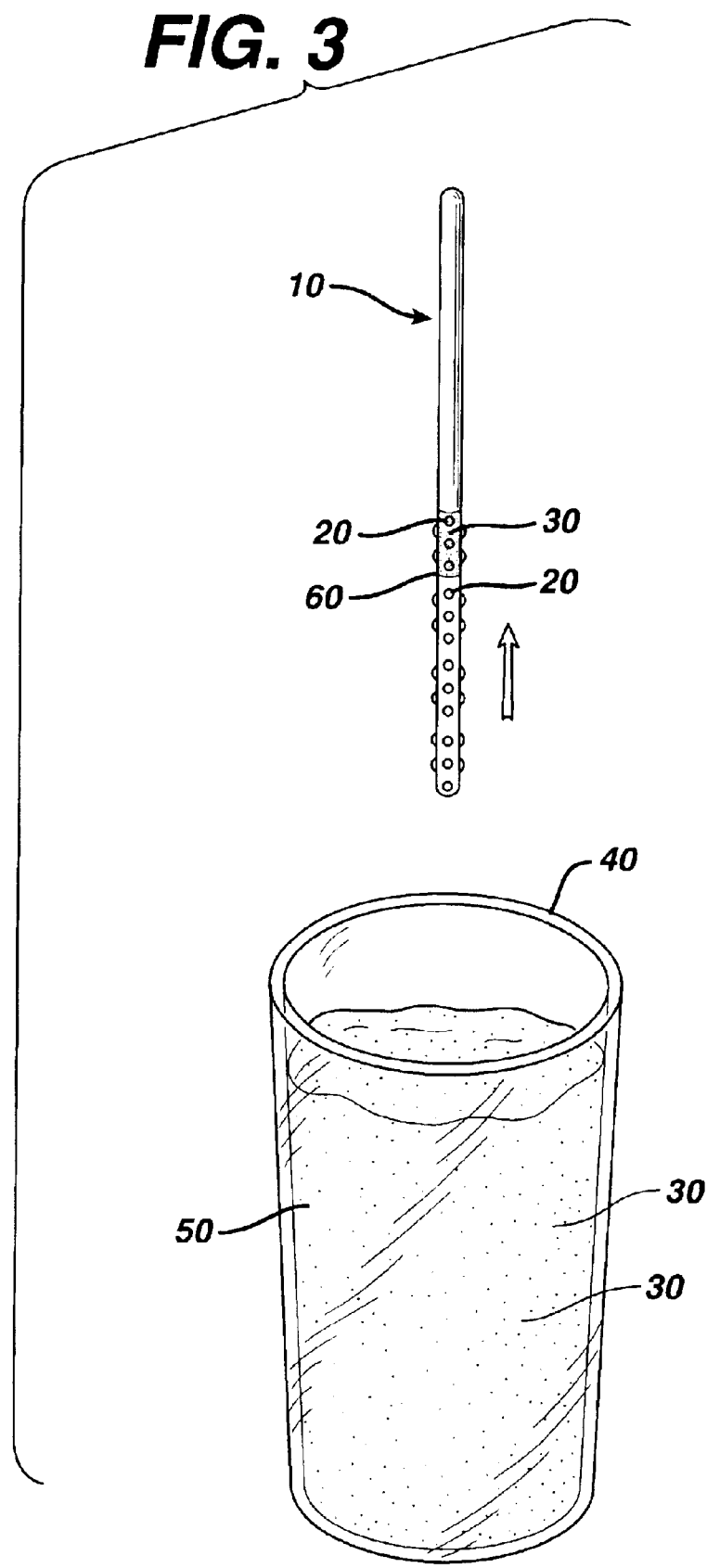
FIG. 3 is a perspective view of device representing one embodiment of the present invention and a vessel containing a liquid after at least part of hydrophilic substance coating was placed in the liquid.

Turning to the Figures, FIGS. 1–3 depict an embodiment of the present invention before, during, and after use. FIG. 1 depicts device 10 having surface area enhancers 20 thereon. Hydrophilic substance coating 30 is depicted as deposited on device 10 and a plurality of marking 60 included on device 10 to provide indicia of amounts of hydrophilic substance that are loaded onto device 10. Vessel 40 is depicted as containing liquid 40.

FIG. 2 depicts device 10 placed in liquid 50. As device 10 is moved in the liquid, the removal of hydrophilic substance coating 20 is facilitated and the hydrophilic substance coating dissolves into liquid 50.

Figure 4:
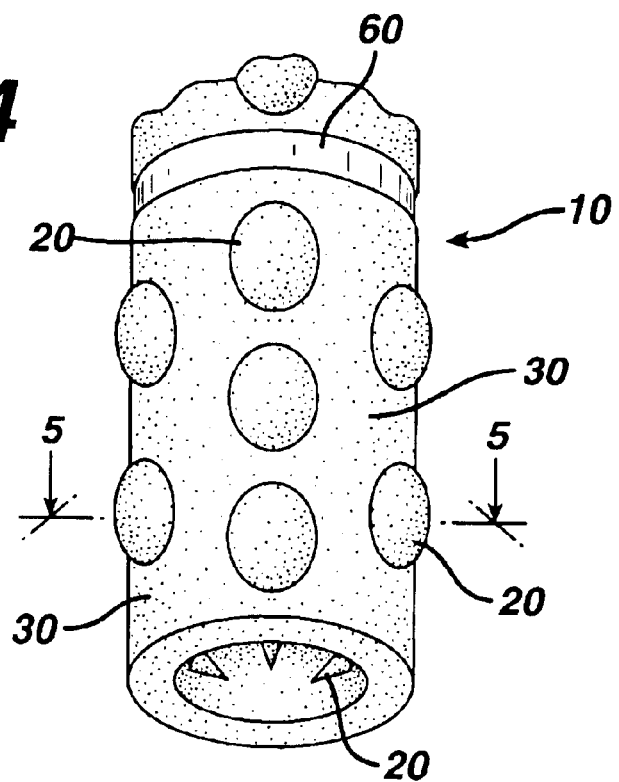
FIG. 4 is a perspective view of one embodiment of the present invention.

FIG. 3, As a result of dissolving or removing hydrophilic substance from device 10, any portion of device 10 not FIG. 4 depicts a magnified view a device having bearing two types of surface area enhancer 20 elements. As seen in this figure, the surface area enhancer 20 may be located on the exterior of device 10 and on the interior of device 10. Alternately, surface area enhancer 20 can be located on either the exterior or on the interior of device 10.

Also depicted in FIG. 4 is marking 60. In this particular embodiment, the material for marking 60 does not permit hydrophilic substance 20 be adhere to it. Thus, marking 60 is automatically produced upon coating of device 10 with hydrophilic substance 20. Alternately, marking 60 may be ink, pigmentation, photolithograph, physical surface alterations, e.g., ribs, and the like.

Device 10 can be any shape or size, but must contain at least one portion that is solid throughout a transverse section. In the embodiment depicted in FIG. 1, device 10 is an elongated shape, e.g., rod or stick. While the materials used to construct device 10 are not important, such materials must permit the hydrophilic substance 30 to be coated, deposited and/or loaded thereon and permit hydrophilic substance 30 to enter the liquid upon exposure to the liquid. Such materials include wood, plastic, and cork.

Figure 5:
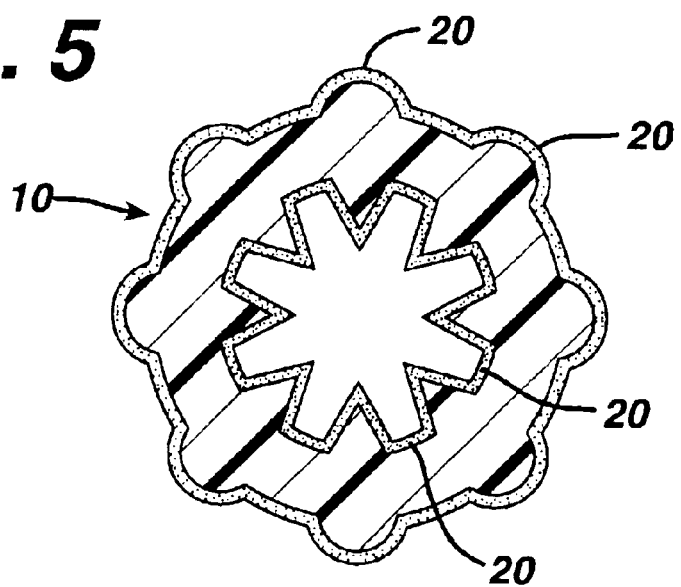
FIG. 5 is a cross-sectional view of the embodiment of the present invention depicted in FIG. 4.
Figure 6:
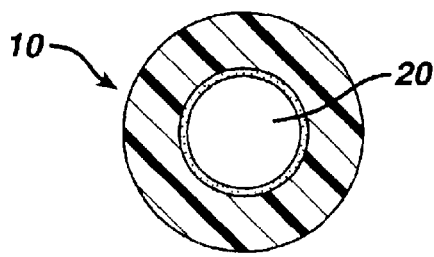
FIG. 6 is a cross-sectional view of one embodiment of the present invention.
Figure 7:
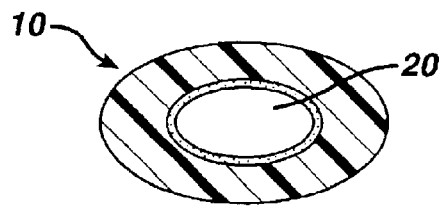
FIG. 7 is a cross-sectional view of one embodiment of the present invention.
Figure 8:
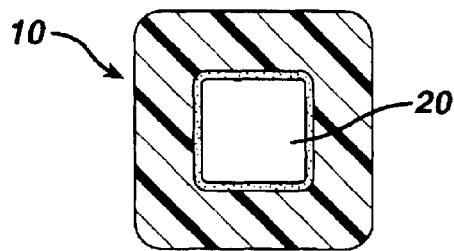
FIG. 8 is a cross-sectional view of one embodiment of the present invention.
Figure 9:
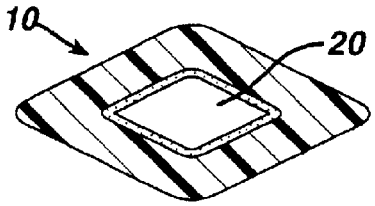
FIG. 9 is a cross-sectional view of one embodiment of the present invention.
Figure 10:
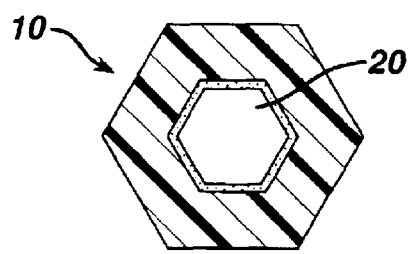
FIG. 10 is a cross-sectional view of one embodiment of the present invention.
Figure 11:
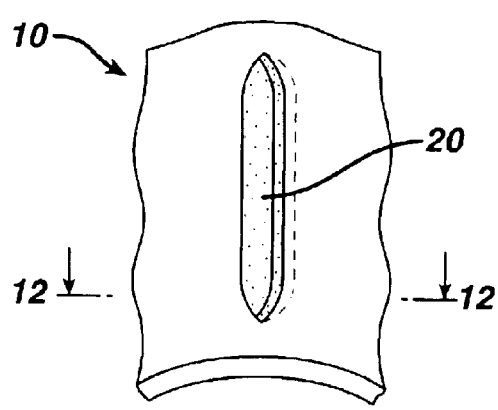
FIG. 11 is a perspective view of one embodiment of the present invention.
Figure 12:
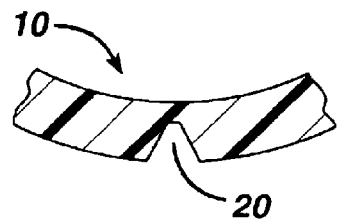
FIG. 12 is a cross-sectional view of the embodiment of the present invention depicted in FIG. 11.
Figure 13:
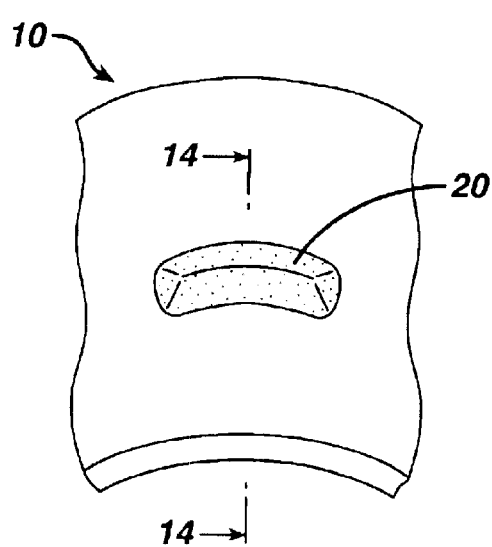
FIG. 13 is a perspective view of one embodiment of the present invention.
Figure 14:
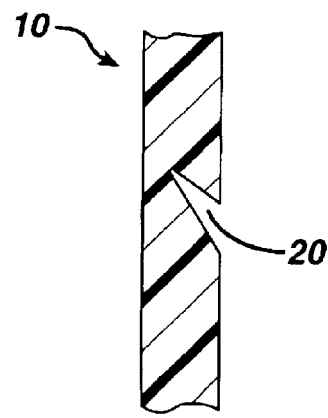
FIG. 14 is a cross-sectional view of the embodiment of the present invention depicted in FIG. 13.
Figure 15:
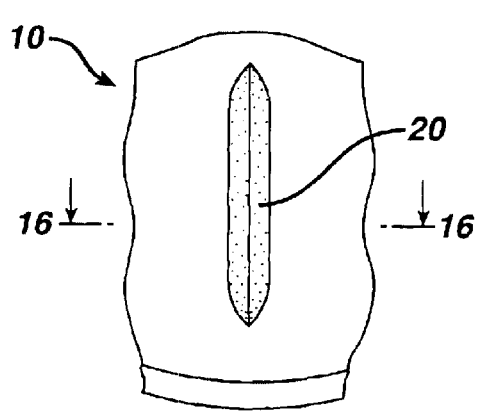
FIG. 15 is a perspective view of one embodiment of the present invention.
Figure 16:
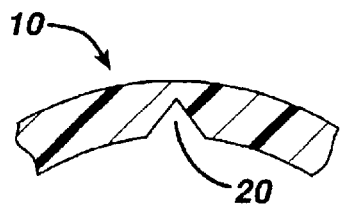
FIG. 16 is a cross-sectional view of the embodiment of the present invention depicted in FIG. 15.
Figure 17:
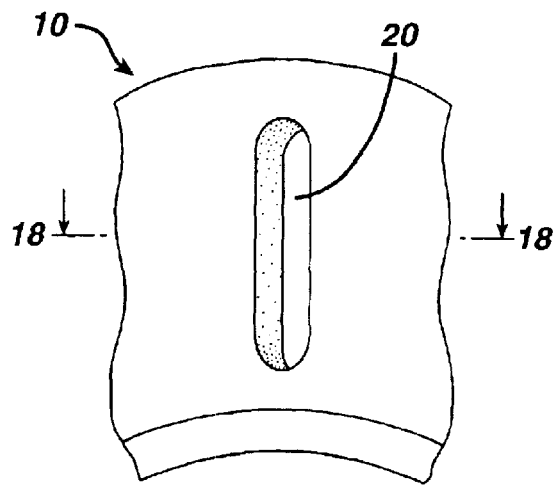
FIG. 17 is a perspective view of one embodiment of the present invention.
Figure 18:
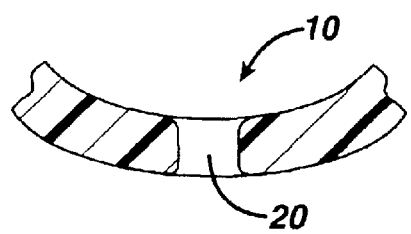
FIG. 18 is a cross-sectional view of the embodiment of the present invention depicted in FIG. 17.

A cross section of device 10 is depicted in FIG. 5 where a plurality of surface area enhancers 20 is found in the interior and the exterior of device 10. FIGS. 6–10 depict alternate embodiments for the shape of a cross section of device 10 having a bore or capillary embedded in the interior as the surface area enhancer 20. Such a design will permit the opening of the bore or capillary to be exposed to the liquid and permit any hydrophilic substance that is coated thereon to dissolve into the liquid.

Surface area enhancer 20 can be any shape. As depicted in FIGS. 1–4, the surface area enhancer 20 can be raised dots. However, the surface area enhancer can take on a variety of shapes and sizes, including, but not limited to, a surface crack, a fissure, a crevice, a protrusion, a capillary, an internal crack, a bore, a fenestra, a slit, tree bark-shaped, and mixtures thereof. FIGS. 1–18 depict various surface area enhancers 20 that are positioned on the exterior of device 10. FIGS. 12, 14, 16, and 18 depict views of cross-sections 12, 14, 16, and 18 of FIGS. 11, 13, 15, and 17.

Figure 19:
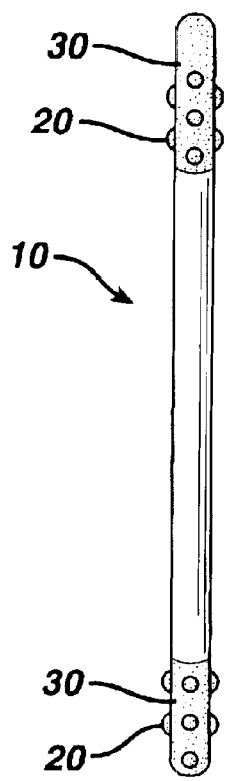
FIG. 19 is a perspective view of one embodiment of the present invention.

FIG. 19 depicts an embodiment of the present invention where opposite ends of device 10 have surface area enhancers 20 and have hydrophilic substance coating deposited thereon. This embodiment provides the ability to use device 10 in another liquid or to incorporate hydrophilic substance coating 30 in a single liquid by dissolving both coated ends in the liquid.

Figure 20:
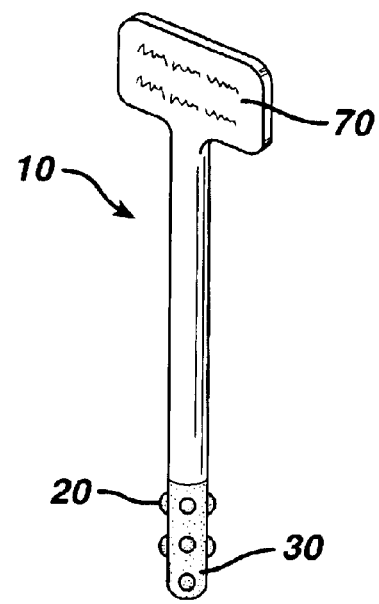
FIG. 20 is a perspective view of one embodiment of the present invention.

FIG. 20 depicts an embodiment of the present invention where handle 70 located on an end of device 10 opposite surface area enhancer 20 and hydrophilic substance coating 30. The handle can be unitary with device 10 or can be a separate piece that is affixed or attached to device 10. The size and shape of handle 70 is not critical to the present invention. Handle 70 an be used to depict words, images, and the like.

Figure 21:
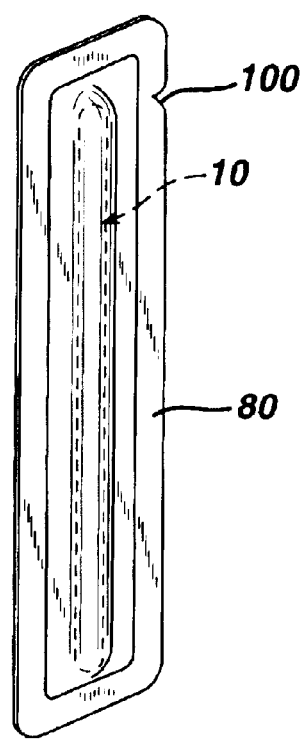
FIG. 21 is a perspective view of one embodiment of the present invention in a package.

FIG. 21 depicts an embodiment of the present invention where device 10 is placed in an individual package 80. Individual package 80 can be made of any materials known in the art, including polypropylene, polyethylene and other polymers used in the packaging arts, foil, and combinations thereof. As depicted in FIG. 21, individual package 80 may include at least one notch 100. Notch 100 is intended to facilitate-opening individual package 80. Other methods of facilitating opening of package 80 can also be used. Such methods include, but are not limited to, perforations, embossments, and the like.

Figure 22:
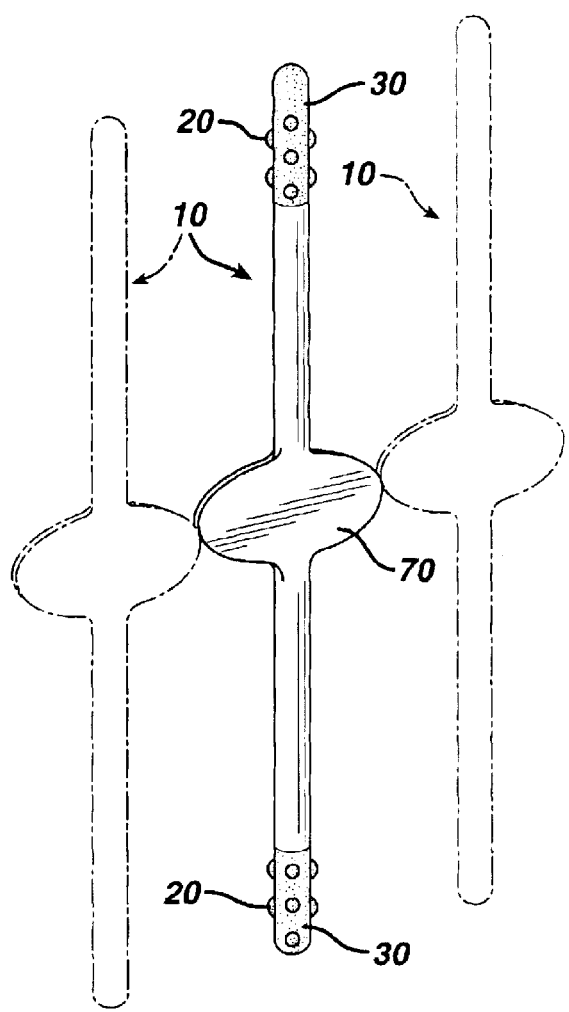
FIG. 22 is a perspective view of one embodiment of the present invention.

FIG. 22 depicts an embodiment of the present invention where handle 70 is located in a center portion of device 10. At opposite ends of device 70 are depicted surface area enhancers 20 and hydrophilic substance coating 30. FIG. 22 also depicts a plurality of devices 10 in seriatim such that when formed handle 70 from a first device 10 is attached to handle 70 of a second device 10. The attached handles 70 can be separated before packaging or just prior to use.

Figure 23:
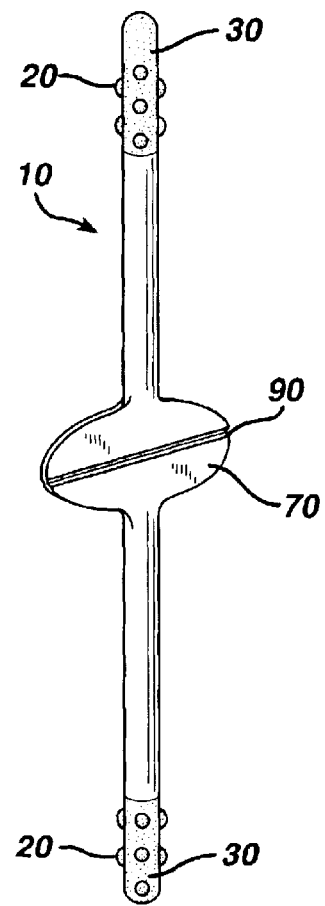
FIG. 23 is a perspective view of one embodiment of the present invention.
Figure 24:
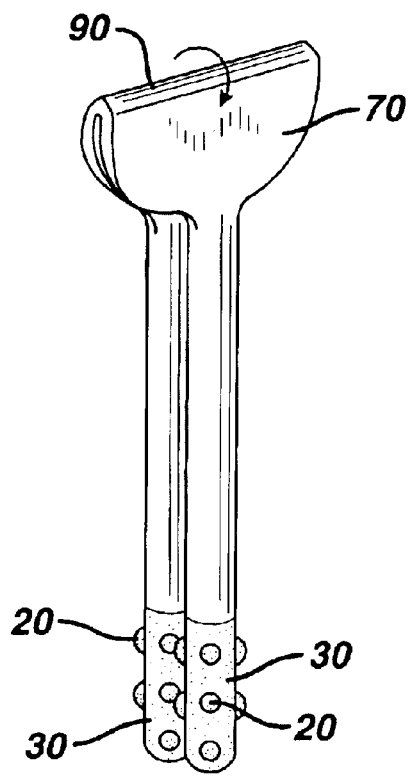
FIG. 24 is a perspective view of one embodiment of the present invention.

FIG. 23 depicts an embodiment of the present invention where area of weakness 90 traverses handle 70 of device 10. In this embodiment, area of weakness 90 permits the user to bring opposite ends of device 10 together as depicted in FIG. 24. Such an embodiment permits the user to increase the amount of hydrophilic substance coating 30 to dissolve in to a liquid. Alternatively, the each of the ends of device 10 may have a different hydrophilic substance coating 30 deposited thereon. For example, one end may have a sucralose coating and the opposite end may have a flavor coating. This embodiment may facilitate manufacturing of device 10 where a plurality of hydrophilic substances are to be coated.

Figure 25:
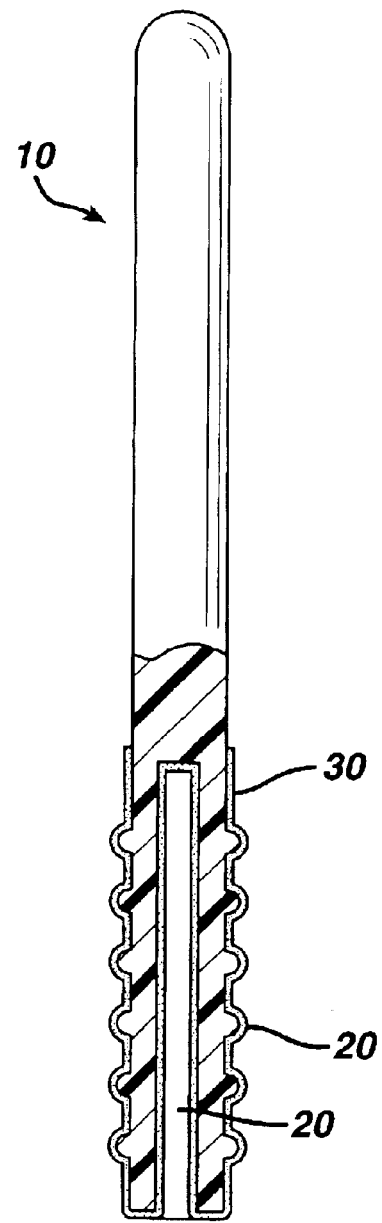
FIG. 25 is a perspective view, partially in section, of one embodiment of the present invention.

FIG. 25 depicts an embodiment of the present invention where device t10 includes exterior and interior surface area enhancers 20 that have hydrophilic substance coating deposited thereon. As shown in FIG. 25, the interior surface area enhancer 20 does not extend end to end, thereby leaving a portion of device 10 solid.

The following examples are provided to further illustrate the device of the present invention, as well as certain physical properties and uses thereof. These examples are illustrative only and are not intended to limit the scope of the invention in any way.

EXAMPLES

Example 1

| Coating 1 | |
|---|---|
| | %, w/w |
| Sucralose | 12 |
| Water | 88 |

After the sucralose is dissolved in the water, a wooden rod with a slit parallel to the axis is dipped into the solution to a depth of about one inch so that about 50 microliters of solution formed a thin film on the surface of the rod and in the slit. The solution is then dried. After drying, the rod contains about 6 mg of sucralose, which is equivalent to one teaspoon of sugar.

Dipping the rod into the solution to a depth of about 2 inches will result in the deposition of about 12 mg of sucralose on the rod, which is equivalent to 2 teaspoons of sugar in sweetness.

Example 2

| Coating 2 | |
|---|---|
| | %, w/w |
| Sucralose | 24 |
| Water | 76 |

After the sucralose is dissolved, a rod with a slit parallel to the axis is dipped into the solution to a depth of about one inch so that about 50 microliters of solution formed a thin film on the surface of the rod and in the slit. The solution is then dried. After drying, the rod contains about 12 mg of sucralose, which is equivalent to two teaspoons of sugar.

Dipping the rod into the solution to a depth of about 2 inches will result in the deposition of about 24 mg of sucralose on the rod, which is equivalent to 4 teaspoons of sugar in sweetness.

Example 3

| Coating 3 | |
|---|---|
| | %, w/w |
| Sucralose | 12 |
| Sucrose | 50 |
| Water | 38 |

The sucralose and sucrose are dissolved in the water, and a rod with slit was dipped into the solution to a depth of about one inch so that about 50 microliters of the solution formed a thin film on the rod. The solution is then dried. This results in a rod with about 6 mg of sucralose, which is equivalent to one teaspoon of sugar. The incorporation of sucrose into the composition provides better adherence, and also conveys a shining appearance.

When dipped to a depth of about 2 inches, the rod contains about 12 mg of sucralose, which is equivalent to 2 teaspoons of sugar in sweetness.

Example 4

| Coating 4 | |
|---|---|
| | %, w/w |
| Sucralose | 12 |
| Ethanol | 88 |

The sucralose is dissolved in the ethanol, and a rod containing a slit is immersed in the solution to a depth of about one inch; which results in approximately 50-microliters of the solution forming a thin film on the rod. The rod is dried, which results in a rod having 6 mg of sucralose and is equivalent to one teaspoon of sugar. Ethanol was found to provide a better fluid adhesion to provide more precise control of the loading or coating; also, the ethanol evaporates more readily than water.

When dipped to a depth of about 2 inches deep, about 12 mg of sucralose is adhered to the rod, which is equivalent to 2 teaspoons of sugar in sweetness.

Example 5

| Coating 5 | |
|---|---|
| | %, w/w |
| Sucralose | 3 |
| Sucrose | 70 |
| Water | 27 |

A solution of sucralose and sucrose is prepared by adding these materials to water and heating with stirring until complete dissolution had occured. A rod was dipped into the slurry to obtain a layer on the end of the rod. The rod is dried, and then repeatedly dipped into the slurry and dried. This results in a glassy shining rock on the tip of the stick. Depending on the size of the resulting rock, the rod can deliver the sweetness equivalent of one to two teaspoons of sugar when it is used to stir a container of beverage.

What is claimed is:

1. A device for dispensing into a liquid at least one hydrophilic substance deposited thereon comprising a body having at least one surface area enhancer and at least one hydrophilic substance deposited on the at least one surface area enhancer, to form a coated surface enhancer, wherein the body further comprises a substantially transverse line of weakness that permits the body to fold along the line of weakness.

* * * * *